Inventor:
Alan Gilbert Royle
By his Attorney: Walter Gunn.

Oct. 16, 1934.  A. G. ROYLE  1,976,966
GLAND AND THE LIKE
Filed March 23, 1932  2 Sheets-Sheet 2

Inventor:
Alan Gilbert Royle.
By his Attorney: Walter Gunn

Patented Oct. 16, 1934

1,976,966

UNITED STATES PATENT OFFICE 1,976,966

GLAND AND THE LIKE

Alan Gilbert Royle, Irlam, England

Application March 23, 1932, Serial No. 600,813
In Great Britain December 16, 1931

2 Claims. (Cl. 137—101)

This invention relates to diaphragm closures and the like, and has for its object an improved method and means whereby a movable member passing through a wall may move relatively thereto to transmit mechanical movements from a member on one side of the wall to a member on the other side of the wall with the minimum of frictional resistance and with an effective seal.

According to the invention the improved method of transmitting movement through an aperture in a wall, covered by a flexible and extensible diaphragm, includes the step wherein the centre of the diaphragm is constrained to an arcuate movement.

According to a further feature of the invention the centre of the diaphragm is constrained to arcuate movement about an axis substantially passing through the centre of the said aperture.

According to a still further feature of the invention the centre of the diaphragm is constrained to an arcuate movement in a plane.

Yet further features of the invention consist in apparatus embodying combinations of parts constructed to transmit movement in accordance with the improved methods above set out.

The accompanying drawings illustrate a boiler feed regulator embodying mechanism operating in accordance with the new methods above set out, wherein.

Figure 1:
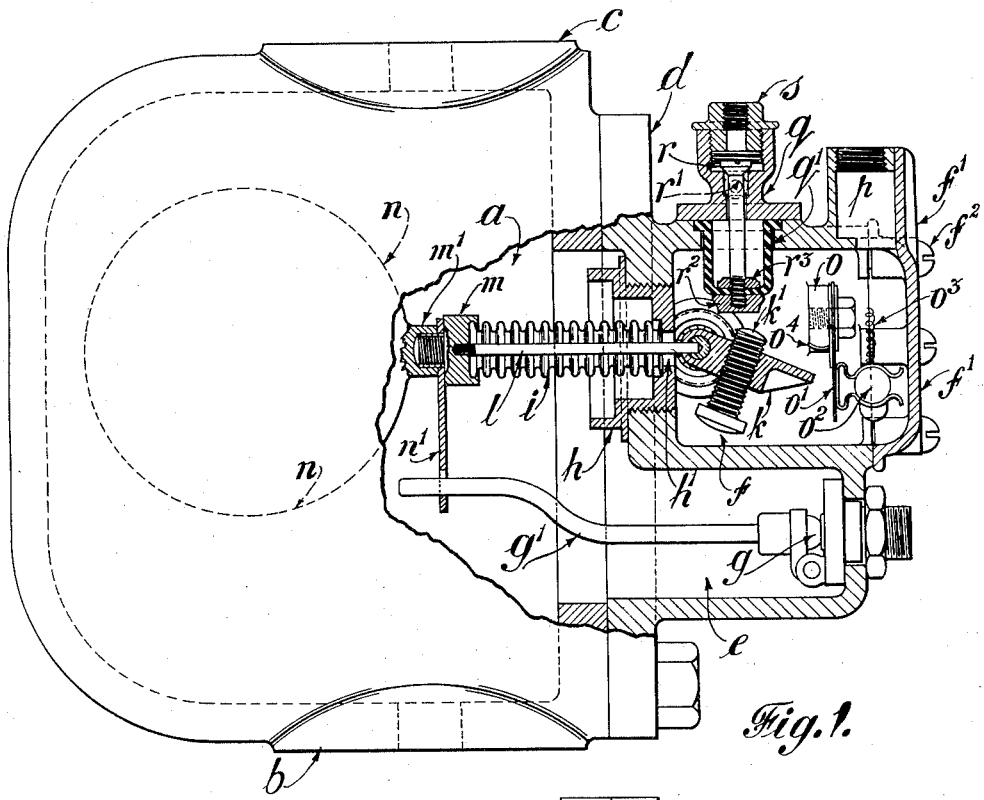
Fig. 1 is a part sectional elevation.
Figure 2:
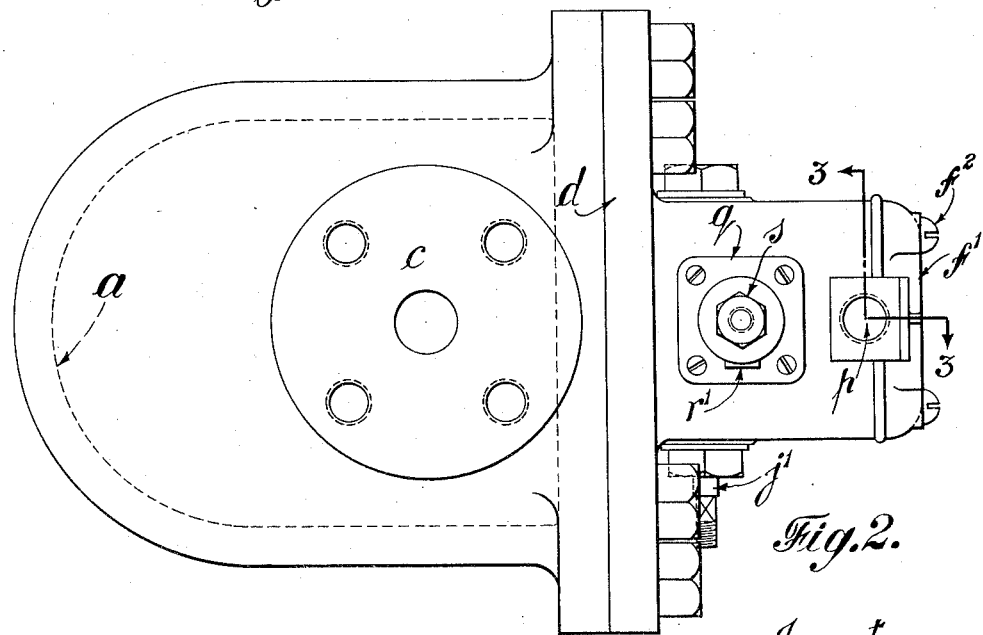
Fig. 2 is an external plan of Fig. 1.
Figure 3:
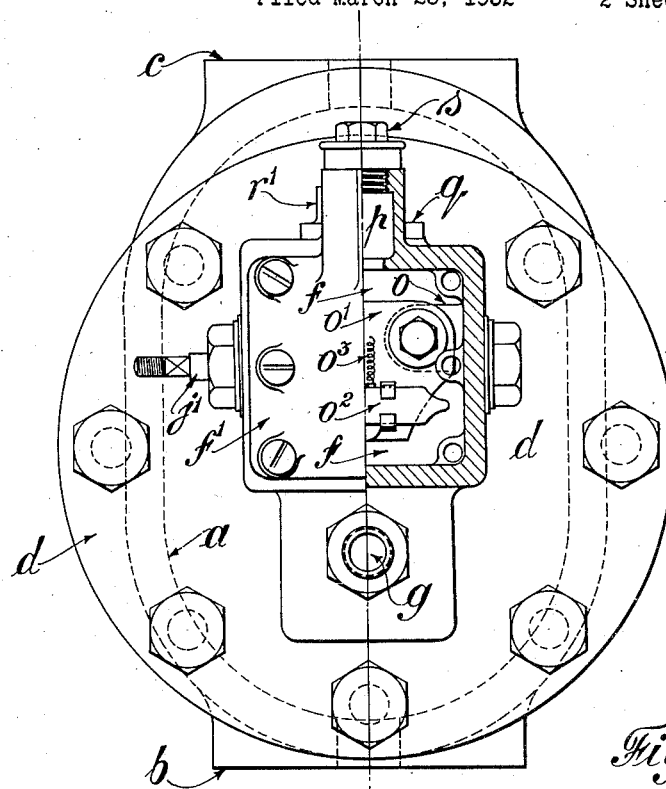
Fig. 3 is a half sectional end elevation on line 3—3 of Fig. 2.
Figure 4:
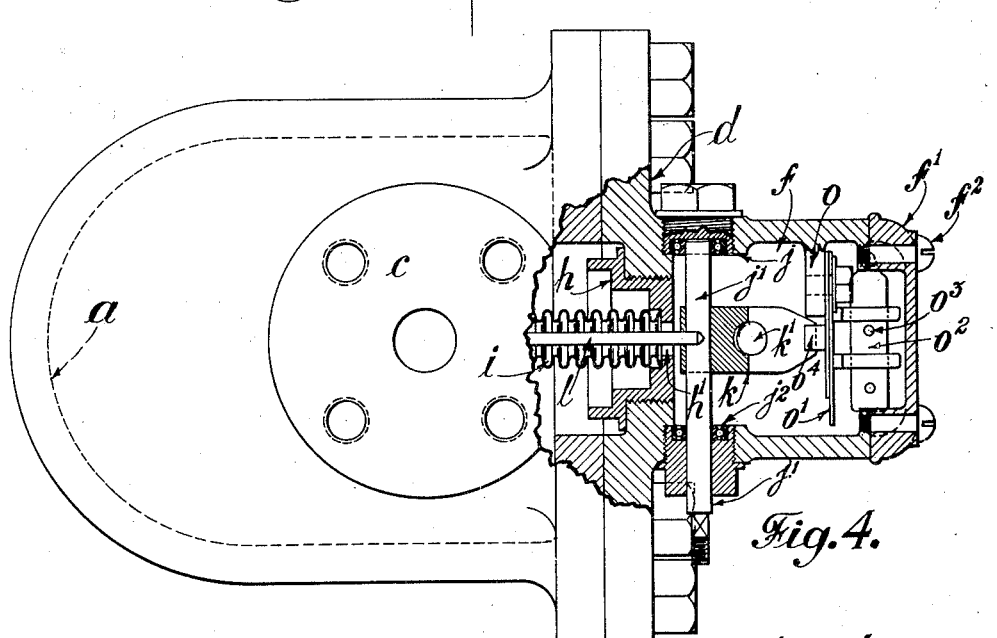
Fig. 4 is a part sectional plan.

As illustrated, the boiler feed regulator comprises a chamber $a$ having connecting flanges $b$ and $c$ for the usual steam and water connections to the boiler. The front of the chamber $a$ is open and over the same is bolted a cover $d$ which is formed with a compartment $e$ open to the inner side of the cover, and a compartment $f$.

In the compartment $e$ is arranged a terminal water valve $g$ of the type usually employed for ball-float operation and having an operating arm $g^1$. In the cover $d$, at the base of the compartment $f$ is a screwed plug $h$ screwed in from the inside and having a central aperture $h^1$, over which and extending inwardly is secured a copper bellows $i$, the open end of the bellows being sealed to the recessed inner face of the plug. Within the compartment $f$ are bosses $j$ supporting a shaft $j^1$ on ball bearings $j^2$. On the shaft $j^1$ between the bosses $j$ is an arm $k$ having an adjustable screw $k^1$ and keyed to the shaft by a rod $l$ which passes through it into a hole drilled into the shaft, in which the rod $l$ is an easy push fit. On the other end of the rod $l$ is screwed an end piece $m$ having a projecting screwed extension $m^1$. The other end of the bellows $i$ is secured and sealed to the end piece $m$. On the screwed extension $m^1$ is a hollow ball $n$ and link $n^1$ the screwing on of the ball serving also to hold the link, the latter being slotted to engage the arm $g^1$ of the valve $g$.

On the compartment $f$ is a cover $f^1$ secured by screws $f^2$. Within the compartment $f$ is a lug $o$ to which is pivoted a plate $o^1$ carrying a mercury switch $o^2$, the electric leads $o^3$ for which may be taken through a lug $p$ shown screwed at its outer end to hold an insulating bush. The plate $o^1$ has a lug $o^4$ adapted to be engaged by the end of the arm $k$.

In the top wall of the compartment $f$ is a valve consisting of a base part $q$ adapted to be secured over an aperture in the wall of the compartment which is shouldered to receive a flexible cup-shaped member $q^1$. The base part $q$ is recessed to form a seating for a valve $r$ below which seating is to be seen an outlet $r^1$, the stem of the valve $r$ being screwed at its lower end and passing through the end of the member $q^1$, clamping nuts $r^2$ and $r^3$ being provided, the former being blind ended.

In the top of the base part $q$ is a screwed plug $s$ which is itself drilled and screwed for a pipe connection.

In operation, the ball float $n$ is pivotally supported on the rod $l$ around which is the bellows-shaped diaphragm $i$ the centre or end of which is constrained by the rod $l$ to move in an arc and in a plane about the shaft $j^1$ the axis of which is across and as near as practicable to the centre of the aperture $h^1$.

It will be seen that in operation the bellows-like tube permits freely the rise and fall movement of the ball float, which movements are transmitted through the short rod to the shaft to operate any suitable mechanism such as a relay valve or an electric switch arranged in known manner. At the same time the bellows-like tube is capable of standing very high pressures and is held by the short rod at a constant extension against closing up. The thrust on the said rod due to pressure within the tank is taken by the ball bearings on the shaft and for that reason anti-friction type bearings are provided by preference so that the maximum of sensitivity is obtained.

The movements of the float may be transmitted through the link $n^1$ to the valve arm $g^1$, or through the arm $k$ to the mercury switch plate $o^1$ or through the adjustable screw $k^1$ to the valve $r$. Preferably the valve $g$ will be dispensed with, a plain pipe connection being provided to replace it through which water may be supplied under pressure from an electrically driven pump the operation of which is controlled by the mercury switch $o^2$. The valve $r$ will be employed as a safety control, being lifted when the float falls to a predetermined level which will only be reached if the water feed has failed, the valve being connected so as to admit air, gas or other fluid pressure to a diaphragm or like means for operating a control valve for say the gas or fuel supply valve of the boiler furnace, or to operate an alarm or both. The compartment $f$ may be closed and sealed and a balancing pressure applied thereto to reduce the thrust on the shaft $j$ from the pressure on the outside of the bellows $i$.

By the invention, the float is essentially provided with an efficient and anti-friction mounting external of the boiler feed chamber. The sensitivity obtainable thereby is employed to the best advantage by using a moving part of the external anti-friction mounting to operate control mechanism for the boiler feed.

As will be apparent, the invention is not limited to the constructional details of the example above given by way of illustration of the nature of the invention, nor is it limited in its application only to boiler feeders, nor again is it limited to the transmission of movement in one plane only as in the example above described.

What I claim is:—

1. A boiler feed regulator comprising a chamber, a rod passing through a hole in a wall of the chamber, a pivot for the rod having its axis outside the chamber, a flexible joint closing the said hole around the rod, a ball float secured to the inner end of the rod, a link depending within the chamber from the ball float and a water inlet valve within the chamber having a lever arm supported by said link.

2. A boiler feed regulator comprising a chamber, a rod passing through a hole in a wall of the chamber, a pivot for the rod having its axis outside the chamber, a flexible bellows joint closing the said hole around the rod, valve and electric switch mechanism outside the chamber and operably coupled to the outer end of the said rod, a ball float secured to the inner end of the rod, a link depending within the chamber from the ball float and a water inlet valve within the chamber having a lever arm supported by said link.

ALAN GILBERT ROYLE.